Figure 1:
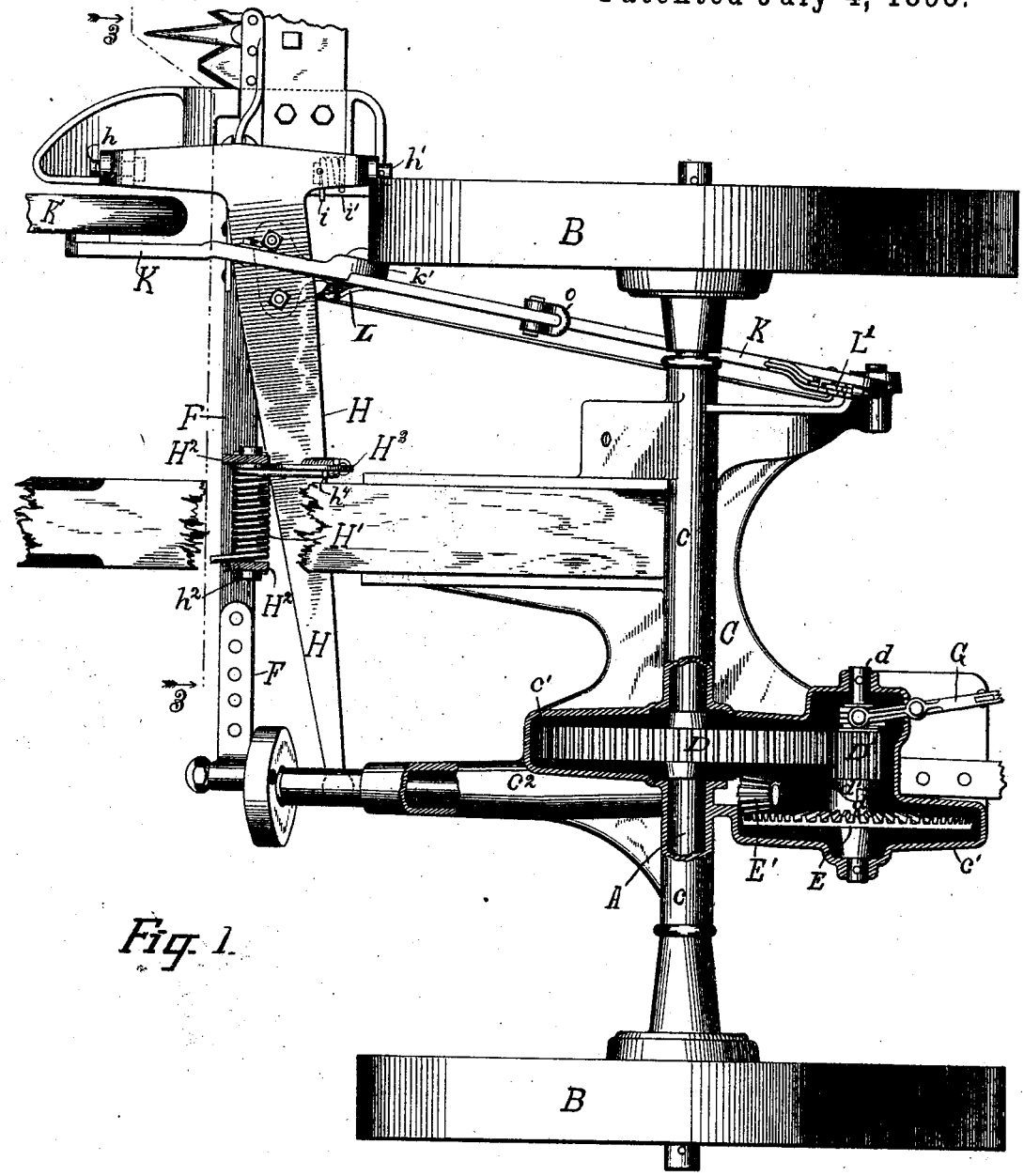

(No Model.)

W. R. BAKER.
MOWER.

No. 500,550.

2 Sheets—Sheet 1.

Patented July 4, 1893.

Witnesses
A. S. Wells.
L. Tassell.

Inventor
William R. Baker.
By his Attorney
Joseph G. Parmenson (No Model.) 2 Sheets—Sheet 2.
W. R. BAKER.
MOWER.
No. 500,550. Patented July 4, 1893.
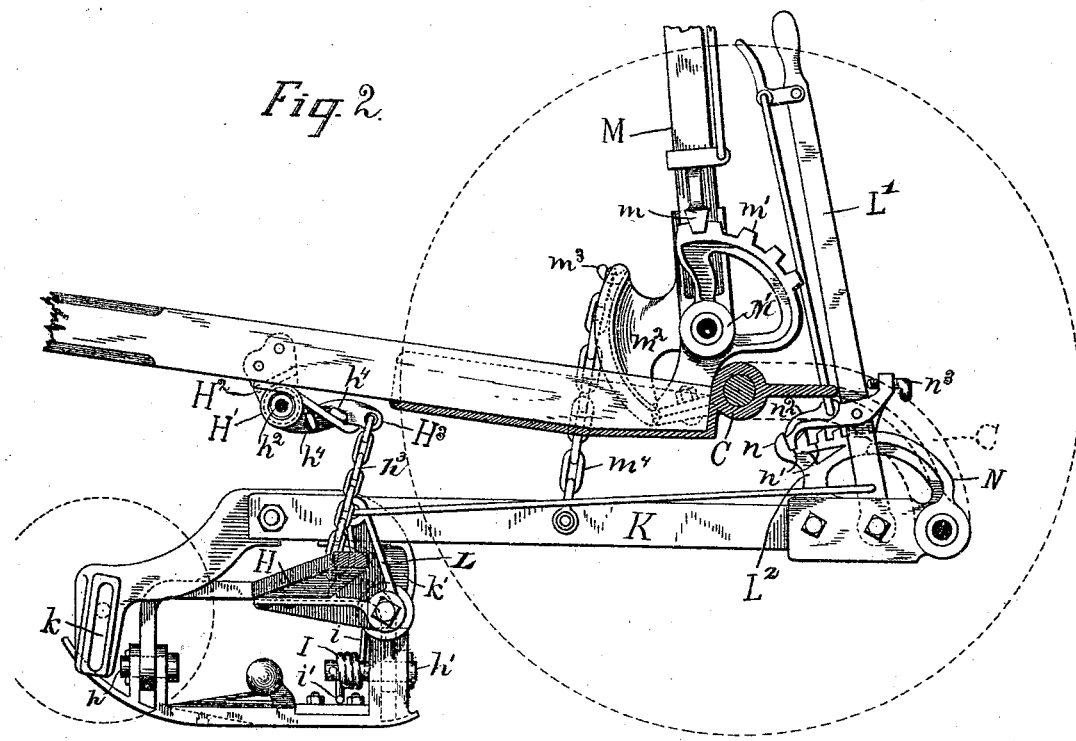
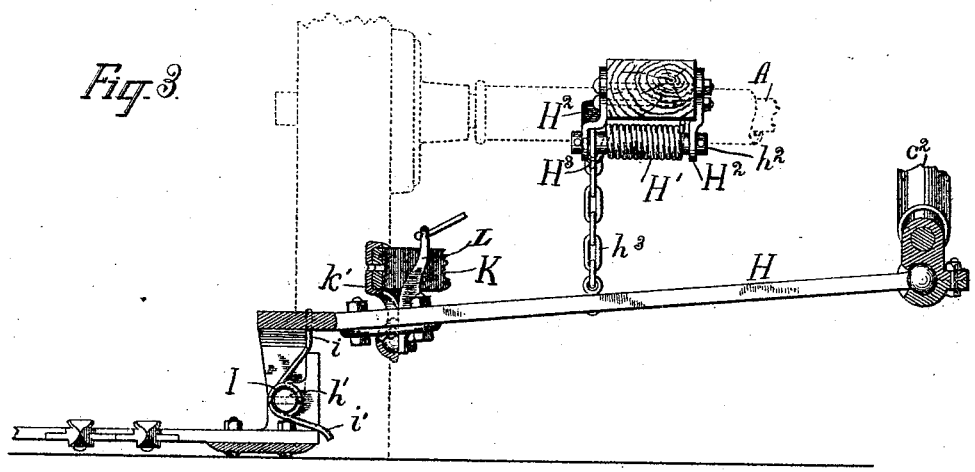
Witnesses
Inventor
William R. Baker
By his Attorney

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

MOWER.

SPECIFICATION forming part of Letters Patent No. 500,550, dated July 4, 1893.

Original application filed March 12, 1887, Serial No. 230,589. Divided and this application filed July 15, 1889. Serial No. 317,618. (No model.)

*To all whom it may concern:*

Be it known that I, WILLIAM R. BAKER, a citizen of the United States, residing at Chicago, in the county of Cook and State of Illinois, have invented certain new and useful Improvements in Mowers, of which the following is a specification.

My invention relates particularly to two wheeled hinge-bar floating-frame mowers and it consists in combining with the main frame and draft-tongue, a floating coupling-frame, a finger-bar hinged to said coupling-frame, a lever-arm pivoted to a pin secured to the draft-tongue and having a series of lateral projections, a spring coiled about the pin and bearing at one end upon the tongue and at the other upon one of the lateral projections, and a flexible connection between the lever arm and the coupling-frame; and also, in combining with the forked coupling-frame and the hinged finger-bar, a spring coiled about one of the pivot-pins which connects said finger-bar to the forks of the coupling-frame, and bearing at one end against the inner edge of one of the forks and at the other against the heel of finger-bar to depress said heel and raise the outer end of the bar.

In the drawings: Figure 1 is a top plan view of a mower embodying my invention, the tongue and gear-case being partly broken away to expose operative parts of the mechanism: Fig. 2 is a side elevation, in section, on a line about centrally of the machine and looking toward the finger-bar. Fig. 3 is a transverse section on the correspondingly numbered line in Fig. 1, and seen in the direction of the arrows.

A represents the main axle of the mower and B the carrying-wheels one at each end of the axle.

C is the main-frame, generally formed as a single casting, with the sleeve, $c$, receiving and protecting the axle and with the gear-box, $c'$, and also with a forwardly extending sleeve, $c^2$, for the crank-shaft, which, in the present instance, is shown as passing beneath the axle. A large spur-gear, D, pinned or keyed to the axle within the gear-case, engages in rear thereof with a long clutch pinion, D', running loosely upon a short spindle, $d$, and having a clutch-face, $d'$, which engages with an opposing clutch-face, $d^2$, upon the hub of the bevel-gear, E, also mounted loosely on the same spindle. This gear in turn engages with a bevel pinion, E', pinned or keyed to the rear end of the crank-shaft just beneath and behind the axle, thus communicating motion to the pitman, F, and through it to the cutter-bar or sickle.

The clutch pinion is operated by a lever, G, through connections which it is unnecessary to recite herein, since they form the subject matter of Letters Patent of the United States granted the McCormick Harvesting Machine Company, as my assignee, on the 8th day of April, 1890, No. 425,016, of which this is a division, but it will be understood that the pinion can be moved lengthwise on its shaft or spindle so as to bring it in or throw it out of engagement with the clutch-face upon the hub of the bevel-gear, thereby starting or stopping the crank-shaft and the cutter.

H represents a coupling-arm or frame universally jointed at its inner end to the under side of the crank-shaft sleeve, and at its outer end forked to form a bridge and connected to the inside shoe of the finger-bar by two pivot-pins $h$, $h'$, one passing through the front arm of the fork and lugs from the front of the shoe, and the other through the rear-arm of the fork and lugs from the heel of the shoe. A spring, H', is secured to the draft-tongue which constitutes in effect a member of the main-frame, above or adjacent to the coupling-arm and connected therewith and arranged to act in such direction as to tend to lift the coupling-arm, thus easing it and the finger-bar and aiding the driver, when he raises the frame by means of the ordinary lifting-lever. In the drawings this easing spring is shown as coiled around a pin, $h^2$, supported in hangers, H², bolted to the draft-tongue and serving as a pivot for a lever-arm, H³, from the outer end of which depends a chain, $h^3$, to a connection with the coupling-frame or bar beneath. Lugs, $h^4$, from the lever-arm serve as seats for one end of the coiled spring whereby its stress may be adjusted, while the other end is braced against the under side of the draft-tongue. The length of the lever is so proportioned to the average motion of the floating frame either in following the undulations of the ground or when raised by the lifting-lever, that, starting from the normal, which, as represented in the second figure of the drawings, is nearly horizontal or at right angles to the line of strain, it will play through an arc of about ninety degrees, that is, from horizontal to vertical. Thus it will follow that when the spring is at least tension its effectiveness upon the lever will be relatively increased, since as the lever rises the lever-arm of resistance decreases in much greater ratio than does the spring force. Thus the spring will act through the lever with substantially equal effective force in its entire play and raise the frame and its attachments with a constant stress. The outer end of the finger-bar tends to sag and dig into the ground, as it cannot well be supported from the mower. To prevent or counterbalance this tendency, so far as may be, I interpose a spring between the coupling-arm and the heel of the finger-bar, arranged to press upon said heel inside of the pivotal axis between it and the coupling-bar. Such a spring is represented at I coiled about the pivot-pin which connects the forked end of said bar with the heel of the inner shoe, one arm, $i$, of this spring extending up and bearing against the inner edge of the fork, while the other arm, $i'$, extends down and inward and bears against the heel of the finger-bar, thus exerting a continual elastic force tending to depress said heel, vibrate the bar on its pivot and lift the outer end of the divider.

A thrust-bar, K, is, as usual, pivoted to a hanger from the main-frame in rear of the axle, and extends forward over the coupling-bar, then is bent down and has at its extreme end a vertical or nearly vertical slot, $k$, in which the stub-axle of the lead-wheel, K', is secured and adjusted up and down. From this thrust-bar, in rear of the coupling arm depends a hanger, $k'$, in which is pivoted an elbow-lever, L, the lower or horizontal arm of which is riveted to the coupling-bar, while the upper arm is link-connected with the tilting-lever, L', in rear of the axle. This tilting lever latches into a segment, $L^2$, upon the main-frame to hold the finger-bar rigidly against rocking in any adjusted position upon its longitudinal axis, but peculiar provisions, which constitute features of the subject-matter of my before mentioned application, and are therefore not herein claimed, are made whereby said lever is connected with its segment in such manner that it may either lock the bar rigidly against a rocking or tilting movement or may allow it to tilt or rock within variable limits or may leave it free to rock without control.

M is a lifting-lever, pivoted to a bracket, M', from the main-frame and having a latch, $m$, locking into a segment-rack, $m'$, rigid with said bracket, and also having at its foot a sheave segment, $m^2$, provided with a hook, $m^3$, and connected by a chain, $m^4$, with the thrust-bar whereby the coupling-bar and finger-bar may both be raised, in which movement the lifting is aided as already stated by the aforesaid compensating-lever and lifting-spring.

Having thus described my invention, what I claim, and desire to secure by Letters Patent, is—

1. The combination substantially as hereinbefore set forth, of the carrying-wheels, the axle, the main-frame, the floating coupling-frame, the counterbalancing spring connecting said finger bar with the coupling frame the hinged finger-bar, the draft-tongue, the pin secured to the draft-tongue, the lever-arm pivoted to said pin, and having a series of lateral projections, the spring coiled about the pin and bearing at one end upon the tongue and at the other upon one of the lateral projections, and the flexible connection between said arm and the coupling-frame.

2. The combination substantially as hereinbefore set forth, of the forked coupling-arm, the finger-bar, the pivot-pins hinging said finger-bar to the forks of the coupling-arm, and the spring coiled about one of said pivot-pins and bearing at one end against the inner edge of one of the forks and at the other against the heel of the finger-bar to depress said heel and raise the outer end of the finger-bar.

WILLIAM R. BAKER.

Witnesses:
WM. DANNEHY,
A. A. BROCK.